J. H. LANE & J. C. SCHENK.
DRIP PAN.
APPLICATION FILED NOV. 5, 1914.

1,169,168. Patented Jan. 25, 1916.

WITNESSES:
W. K. Ford
James P. Barry

INVENTORS
John H. Lane &
John C. Schenk
BY
ATTORNEYS

UNITED STATES PATENT OFFICE.

JOHN H. LANE AND JOHN C. SCHENK, OF DETROIT, MICHIGAN, ASSIGNORS TO PENINSULAR STOVE COMPANY, OF DETROIT, MICHIGAN, A CORPORATION OF MICHIGAN.

DRIP-PAN.

1,169,168.  Specification of Letters Patent.  Patented Jan. 25, 1916.

Application filed November 5, 1914. Serial No. 870,432.

*To all whom it may concern:*

Be it known that we, JOHN H. LANE and JOHN C. SCHENK, citizens of the United States of America, residing at Detroit, in the county of Wayne and State of Michigan, have invented certain new and useful Improvements in Drip-Pans, of which the following is a specification, reference being had therein to the accompanying drawings.

The invention relates to drip pans for broiling burners of gas stoves or the like, and resides in the novel arrangement of the gridiron to the drip pan; in the novel manner of supporting the gridiron; and further, in the peculiar construction of the drip pan.

Figure 1:
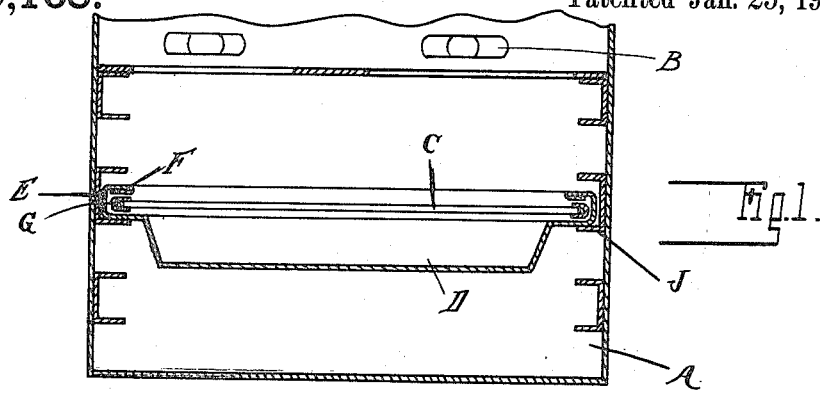
Figure 2:
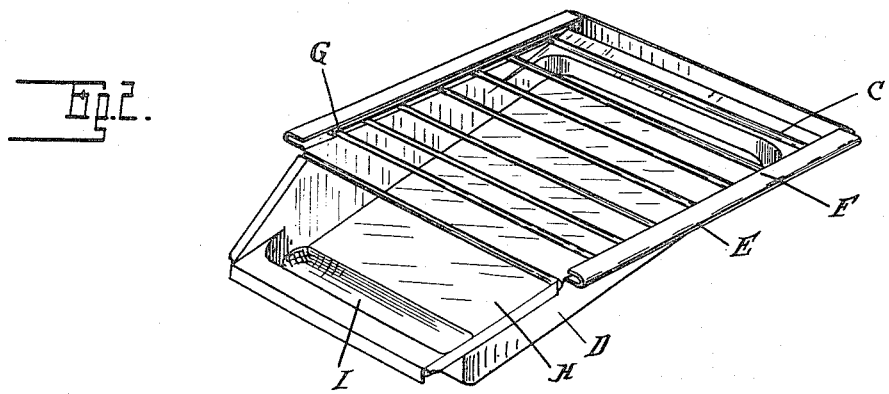
Figure 3:
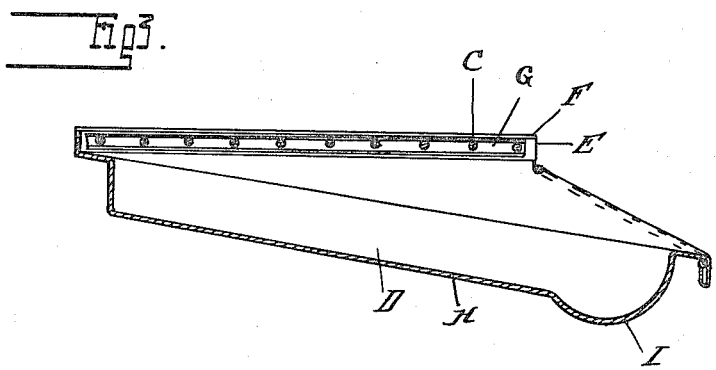

In the drawings,—Figure 1 is a fragmentary vertical section through an oven having the improvement applied thereto; Fig. 2 is a perspective view of the drip pan and gridiron; and Fig. 3 is a section on the line $x$—$x$ of Fig. 2.

A designates an oven of a gas stove, and B the broiling burner thereof.

C is a gridiron and D is a drip pan.

In constructions now in general use the gridiron, while carried by the drip pan, is not connected thereto but merely rests upon the pan. Such a construction is objectionable since when the article being broiled sticks to the grid, if the latter is free to be lifted from the drip pan it is difficult to turn the article or remove it from the grid, for one hand of the operator is usually required to support the forward end of the drip pan when the latter is withdrawn from the oven a sufficient distance to permit access to the article upon the grid.

With the construction embodying the invention the grid is connected to the drip pan so as not to be lifted therefrom when the article being broiled is turned upon or removed from the grid. Preferably the connection between the drip pan and the gridiron, however, is such as to allow the grid to be disengaged from the pan when it is so desired.

In the one embodiment of the invention shown in the drawings, the drip pan D is provided with laterally-extending portions or flanges E having inwardly-extending rebent portions F forming guides at opposite sides of the drip pan, which are adapted to receive the sides G of the grid. By this arrangement, while the grid may be longitudinally drawn out of engagement with the guides, it is prevented from being lifted out of engagement with the drip pan. Preferably the ends of the return bent portions F turn inwardly to form two plies of material, as shown in Fig. 3.

The pan D also is of novel construction, and in the structure shown is made from a single sheet metal stamping having an inclined bottom H to allow the grease to drain away from beneath the burners. Preferably adjacent the forward end of the drip pan D the bottom has a depression or trough-shaped portion I within which the grease will collect. As this depression is some little distance below the burners the danger of the grease in the drip pan catching on fire is eliminated. The flanges or portions E form the supports for the drip pan and are adapted to engage the usual guides J upon the sides of the oven.

From the foregoing description it will be readily apparent that not only is the drip pan of simple construction, but also the connection between the drip pan and the grid is such as to obviate the lifting of the grid out of engagement with the drip pan when the article upon the grid is being turned or removed.

What we claim as our invention is:—

1. The combination with a drip pan having laterally-extending flanges upon opposite sides thereof, forming supports for the pan and provided with rebent portions forming guides at opposite sides of the pan, and a grid engageable with said guides by a movement longitudinally of the pan.

2. The combination with a drip pan provided with laterally extended supporting portions shaped to form guides, of a grid having its lateral edges engageable with said guides, the rear wall of the drip pan forming an abutment at its upper edge limiting rearward movement of the grid in said guides.

In testimony whereof we affix our signatures in presence of two witnesses.

JOHN H. LANE.
JOHN C. SCHENK.

Witnesses:
F. B. GARLICK,
JOHN F. O'BRIEN.